(12) United States Patent
Gaurav et al.

(10) Patent No.: US 7,761,481 B2
(45) Date of Patent: Jul. 20, 2010

(54) SCHEMA GENERATOR: QUICK AND EFFICIENT CONVERSION OF HEALTHCARE SPECIFIC STRUCTURAL DATA REPRESENTED IN RELATIONAL DATABASE TABLES, ALONG WITH COMPLEX VALIDATION RULES AND BUSINESS RULES, TO CUSTOM HL7XSD WITH APPLICABLE ANNOTATIONS

(75) Inventors: Suraj Gaurav, Issaquah, WA (US); Mathrubootham Janakiraman, Redmond, WA (US); Surendra Machiraju, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 739 days.

(21) Appl. No.: 11/079,582

(22) Filed: Mar. 14, 2005

(65) Prior Publication Data
US 2006/0206502 A1 Sep. 14, 2006

(51) Int. Cl.
G06F 7/00 (2006.01)
(52) U.S. Cl. .................. 707/804; 707/796; 707/809
(58) Field of Classification Search ................. 707/100, 707/101, 102, 104.1, 999.102, 803, 804, 707/809, 796
See application file for complete search history.

(56) References Cited

U.S. PATENT DOCUMENTS

| | | | |
|---|---|---|---|
| 6,836,890 B1 | 12/2004 | Watts, Jr. et al. | |
| 6,996,589 B1 * | 2/2006 | Jayaram et al. | 707/204 |
| 7,421,458 B1 * | 9/2008 | Taylor et al. | 707/203 |
| 7,467,149 B2 | 12/2008 | Gaurav | |
| 7,587,415 B2 | 9/2009 | Gaurav | |
| 2002/0129059 A1 * | 9/2002 | Eck | 707/513 |
| 2002/0161749 A1 * | 10/2002 | Pratt | 707/3 |
| 2002/0178103 A1 | 11/2002 | Dan et al. | |
| 2003/0088543 A1 * | 5/2003 | Skeen et al. | 707/1 |
| 2003/0130845 A1 | 7/2003 | Poplawski | |
| 2003/0225770 A1 * | 12/2003 | Lang et al. | 707/100 |
| 2004/0088320 A1 * | 5/2004 | Perry | 707/103 R |
| 2004/0139111 A1 * | 7/2004 | Schoettger et al. | 707/104.1 |
| 2004/0153405 A1 | 8/2004 | Millary et al. | |
| 2004/0177062 A1 * | 9/2004 | Urquhart et al. | 707/3 |
| 2004/0186840 A1 | 9/2004 | Dettinger et al. | |
| 2004/0205562 A1 | 10/2004 | Rozek et al. | |
| 2005/0091639 A1 | 4/2005 | Patel | |
| 2005/0108057 A1 | 5/2005 | Cohen et al. | |
| 2005/0114479 A1 | 5/2005 | Watson-Luke | |

(Continued)

OTHER PUBLICATIONS

Robert H. Dolin, Liora Alschuler, Sandy Boyer, Calvin Beebe, An Update on HL7's XML-based Document Representation standards, 2000, AMIA Inc. p. 190-194.*

(Continued)

*Primary Examiner*—Hosain T Alam
*Assistant Examiner*—Amy Ng
(74) *Attorney, Agent, or Firm*—Workman Nydegger

(57) ABSTRACT

Systems and methods are disclosed that facilitate transforming business and encoding rules defined in a persistent and relational format into XML schemas that provide a message format and validation logic for the message. A message can be received in delimited flat-file format and parsed to facilitate generating a value-added XML schema that represents both encoding rules and business rules associated with the message. The systems and methodologies detailed herein can be employed, for example, in applications utilized in a healthcare provider space and can be consistent with Health Level 7 standards to improve message validation and/or processing.

15 Claims, 12 Drawing Sheets

U.S. PATENT DOCUMENTS

| | | | |
|---|---|---|---|
| 2005/0138048 A1* | 6/2005 | Jin et al. | 707/100 |
| 2005/0213722 A1* | 9/2005 | Stormon et al. | 379/127.01 |
| 2005/0222996 A1* | 10/2005 | Yalamanchi | 707/4 |
| 2005/0268217 A1* | 12/2005 | Garrison | 715/505 |
| 2005/0273365 A1 | 12/2005 | Baumgartner et al. | |
| 2006/0064428 A1* | 3/2006 | Colaco et al. | 707/101 |
| 2006/0101058 A1 | 5/2006 | Chidlovskii | |
| 2006/0161840 A1* | 7/2006 | Cohen et al. | 715/513 |
| 2006/0179067 A1* | 8/2006 | Bechtel et al. | 707/100 |
| 2007/0198539 A1 | 8/2007 | Warshavsky et al. | |

OTHER PUBLICATIONS

OA Dated Jun. 30, 2008 for U.S. Appl. No. 11/079,661, 35 pages.
OA dated Jun. 4, 2008 for U.S. Appl. No. 11/079,424, 220 pages.
Office Action dated Jul. 9, 2007 for U.S. Appl. No. 11/079,424.
Office Action dated Sep. 19, 2008 for U.S. Appl. No. 11/079,424.
Notice of Allowance dated May 4, 2009 for U.S. Appl. No. 11/079,424.
Office Action dated May 2, 2007 for U.S. Appl. No. 11/079,661.
Office Action dated Oct. 19, 2007 for U.S. Appl. No. 11/079,661.
Office Action dated Dec. 21, 2007 for U.S. Appl. No. 11/079,661.
Notice of Allowance dated Sep. 12, 2008 for U.S. Appl. No. 11/079,661.

* cited by examiner

SCHEMA GENERATOR: QUICK AND EFFICIENT CONVERSION OF HEALTHCARE SPECIFIC STRUCTURAL DATA REPRESENTED IN RELATIONAL DATABASE TABLES, ALONG WITH COMPLEX VALIDATION RULES AND BUSINESS RULES, TO CUSTOM HL7XSD WITH APPLICABLE ANNOTATIONS

CROSS-REFERENCE TO RELATED APPLICATIONS

This application is related to co-filed U.S. patent application Ser. No. 11/079,661 entitled "COMPLEX SYNTAX VALIDATION AND BUSINESS LOGIC VALIDATION RULES, USING VAXs (VALUE-ADDED XSDs) COMPLIANT WITH W3C-XML SCHEMA SPECIFICATION" filed on Mar. 14, 2005, and co-filed U.S. patent application Ser. No. 11/079,424, entitled "SINGLE-PASS TRANSLATION OF FLAT-FILE DOCUMENTS INTO XML FORMAT INCLUDING VALIDATION, AMBIGUITY RESOLUTION, AND ACKNOWLEDGEMENT GENERATION" filed on Mar. 14, 2005, the entireties of which are incorporated by reference herein.

TECHNICAL FIELD

This invention is related to integration brokers and message processing, and more particularly to transforming encoding rules from a relational format to an XML schema to format and validate messages.

BACKGROUND OF THE INVENTION

The evolution of computers and networking technologies from high-cost, low-performance data processing systems to low-cost, high-performance communication, problem solving and entertainment systems has provided a cost-effective and time saving means to lessen the burden of performing every day tasks such as correspondence, bill paying, shopping, budgeting and information gathering. For example, a computing system interfaced to the Internet, via wire or wireless technology, can provide a user with a channel for nearly instantaneous access to a wealth of information from a repository of web sites and servers located around the world, at the user's fingertips.

With regard to business-to-business applications, message processing and routing is of paramount importance. Integration brokers can be employed to facilitate bi-directional communication between such applications, and are often employed to process millions of messages per day. Large messages require rapid and efficient processing. Modifying messages on an individual basis can be time-consuming and tedious. Thus, an unmet need exists in the art for systems and methodologies that overcome the aforementioned deficiencies.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention disclosed and claimed herein, in one aspect thereof, comprises a model for transforming business rules and/or encoding rules defined in a persistent and relational format into extensible markup language (XML) schema that provide message format and validation logic for the message. For example, a schema generator can receive data from a metadata relational database, such as flat-file-delimited data (e.g., a Health Level 7 document, . . . ) native XML schema definitions (XSDs), etc., and can reorganize and annotate (e.g., with business rules, encoding rules, validation rules, grouping orders, . . . ) such data to generate value-added XSDs (VAXs) that facilitate simultaneous conversion of a first message (e.g., document) into a plurality of message versions formatted for transmission to a plurality of different destination applications.

In another aspect of the subject invention, a system is provided that facilitates generating schema compatible with the Health Level 7 (HL7) standards body for application integration in the healthcare provider space. According to this aspect, a schema generator can receive a message that is in a delimited flat-file format and bound by encoding rules defined as "pipe-and-hat" (ER7-HL7). The schema generator can generate an XML schema from a relational database for each message type or transaction type. Messages can then be translated and/or transformed according to preconfigured rules specific to a destination to which the message is to be transmitted.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
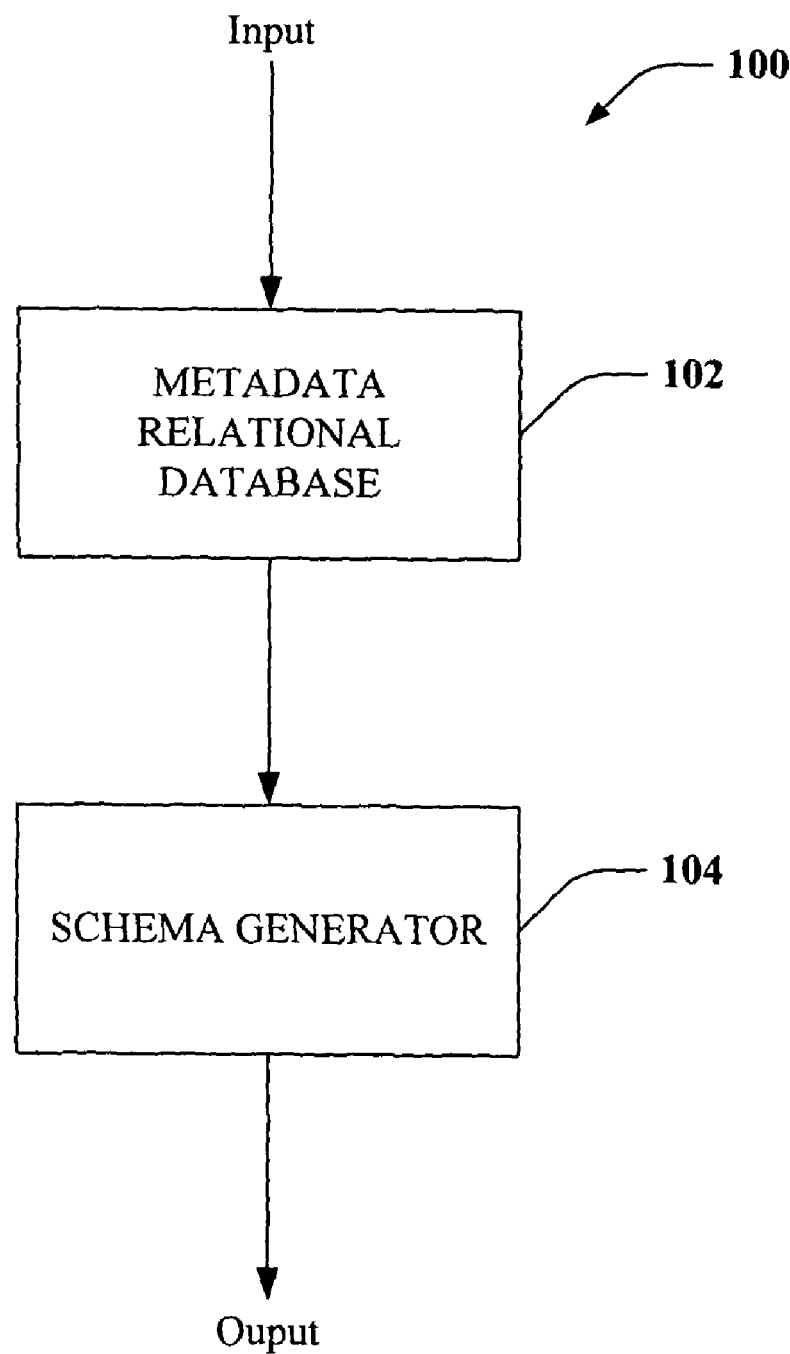
FIG. 1 illustrates a system 100 that facilitates generating value-added XML schema from flat-file delimited data stored in a relational database in accordance with an aspect of the subject invention.

The following terms are used throughout the description, the definitions of which are provided herein to assist in understanding various aspects of the subject invention.

Message: a business document that adheres to one of several well-defined structures that are unambiguously understood by different components of a processing system.

Message format: structural representation of a message, as defined by a business application that sends or receives the message, or as required by a specific industry standard that governs the semantics of the underlying message exchange.

HL7: Health Level Seven, HL7, is an American National Standards Institute (ANSI) approved standards developing organization (SDO). HL7 is considered to be the standards body for application integration in the healthcare provider industry.

ER7: also known as the 'pipe' and 'hat' encoding format. The encoding rules for data to be streamed as delimited flat files.

Message schema/XML schema, or XSD: the specification of the rules that define the set of all possible valid messages in a given message format.

HL7XSD: a representation of the HL7-ER7 encoding rules and structural data in relational database tables, along with complex validation rules and business rules, to customize HL7XSD with applicable annotations.

Message subschema: a subset of the message schema that describes portions of the message.

XSD Engine/Schema Generator/Integration Engine: a software program that is capable of performing both the translation process and the transformation process on a message.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention can be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines, etc.) can be employed in connection with performing automatic and/or inferred action in connection with the subject invention.

Integration brokers or engines are common in business-to-business (B2B) and enterprise application integration (EAI) applications. The integration brokers can receive messages or data packets in widely varied formats, from various sources, via various transport mechanisms. Pre-configured business rules act on these messages and can trigger other actions. Business rules and validation logic are often expressed in specific forms, such as, for example, extensible markup language (XML) Schema. According to an aspect of the invention, an integration engine can employ a custom XML Schema definition language, such as an HL7XSD version of an XML Schema. Messages can then be routed to other destinations through specified transport mechanisms, after optionally undergoing translation into formats suitable for such destinations. A translation process need not alter the message content, but data in some portions of the message can be altered via a transformation process based on pre-configured rules that are specific to a destination. A single incoming message can thus be broadcast to multiple destinations in a message format acceptable to each destination to which it is broadcast. Business rules can be different for different types of messages, which in turn can be of arbitrarily large size.

The subject invention provides a new model for transforming business and/or encoding rules defined in a persistent and relational format into XML Schema, which provides a message format as well as validation logic for the message. A message routed by an integration engine in this scenario can be received in a delimited flat file format and can be bound by encoding rules defined as ER7-HL7 (e.g., pipe-and-hat delimited format, . . . ). To enable the integration engine to parse the flat file stream into XML, or to serialize an XML-encoded document back into ER7-encoded delimited flat file format, the business rules and message structure can be represented as an XSD schema. Standards bodies such as HL7.org publish business and encoding rules separately. With regard to ER7, business rules are also available in a relational format and encoding rules in word documents. The subject invention can generate XML schema from the relational database for each message or transaction type. The invention can appropriately annotate the XML schema for flat file processing and application of encoding rules.

Referring now to FIG. 1, there is illustrated a system 100 that facilitates generating value-added XML schema from flat-file delimited data stored in a relational database in accordance with an aspect of the subject invention. Input can be received and/or stored by a metadata relational database 102 that is operatively coupled to a schema generator 104. The relational database 102 can comprise a set of data items organized as formally described tables. Data items can be reorganized, accessed, reassembled, and the like in myriad ways without reorganization of the tables themselves. Tables in the database 102 can contain one or more data categories, usually in columns. Rows in the database 102 can comprise unique instances of data for the categories defined in the respective columns. Columns in the database 102 can be associated with predefined domains that delineate possible values that can reside in a data column. Additionally, constraints can be assigned to data values and/or domains comprising such data values. A table of metadata can be generated that comprises formal descriptions of tables, columns, rows, domains, and constraints associated with the database 102. Relational databases are easily extensible, and information categories can be added to extant relational databases without requiring modification to applications that employ such databases.

Input messages can be formatted as, for example, external data representations (XDRs), data type definitions (DTDs), native XML schema definitions (XSDs), and the like. Messages stored in the relational database 102 can comprise, for instance, a header portion that defines delimiters employed to facilitate parsing the flat-file data, and a body portion that comprises information represented as flat-file data. The schema generator 104 can parse the native XSD (and/or other input type), generate two groups of schemas (e.g., metadata schemas and business rule schemas) based on the native file (typically in an HL7-ER7 format), link the two schemas together, and add annotations to generate a value-added XSD (VAX), which can then be output and stored to facilitate global modification of metadata and/or generation of multiple versions of messages.

Typically, five flat-file delimiters can be specified to facilitate parsing a message when employing ER7 delimiting standards. For example, a "|" symbol can be employed to delimit a particular data field within a segment, while a "^" symbol can be employed to delimit a component within the data field. A "&" symbol can be employed to delimit subcomponents within a component. Other delimiters can optionally include a "\" and a "~", which represent an escape character and a "repeating" delimiter, respectively. For example, the tilde can indicate that data represented in a component delimited thereby is repeated in the message. The backslash indicates that data following the backslash is in fact data, such that an ampersand contained therein is not to be interpreted as a delimiter, but rather as an ampersand. The following example illustrates a simple HL7 flat-file message comprising a header portion, a body portion, and Z-segments that comprise miscellaneous information.

---

MSH|^~\&|srcApps|srcFac|dstApp|dstFac|200307092343|sec|ADT^A01| msgid1|P|2.3.1|||AL
EVN|A01|198808181318||01
PID||M11|M11|JONES^WILLIAM^A^JR||19310615|M||C|123 LOCAL DRIVE^ANYTOWN^ST^12345|GL|(999)555- 1234|(999)555-4321||M|A|M11|987654321|143257NC
NK1|1|WIFE
PV1|1|I|2000|A|||004777,SMITH,JOHN,J.|||SUR|||||A0
ZSeg1|pid231 |any text
ZSeg2|other patient information

---

The above example comprises a message header portion denoted as "MSH," which comprises information related to the delimiter definition, HL7 version employed to create the message, and the like. For instance, "EVN" and "PID" denote segments within the message. The body portion of the message is that portion between the message header and the Z-segments in the message. Fields within an HL7 message can have specified data types associated therewith. For example, fields and components can comprise simple data types as well as complex data types, while subcomponents are typically of simple type. For example, the patient identity segment, "PID," comprises a plurality of fields. One such field comprises a patient name (William A. Jones Jr.) where the individual components of the patient's name within the field are delimited by "^" symbols.

The flat-file message format represented above does not permit segments to be grouped. The schema generator 104 can group segments and/or portions thereof according to "sequence" and/or "choice" methodologies and can add annotations to a VAX schema to define such grouping formats. Additionally, groups can comprise other groups of segments.

Based on information contained in the flat-file message, the schema generator 104 can construct two sets of schemas. A first set of schemas can represent encoding rules as metadata schemas, which can comprise representations of segments, data fields, data types (e.g., fields, components, subcomponents . . . ), and the like. A second group of schemas can represent business rules associated with the message. Business rules define trigger events associated with the message. For example, a trigger event can be an admissions message, a doctor referral, a message regarding a transfer between wards, a message related to discharge of a patient, etc. Each trigger event can be described by a schema: for instance, the exemplary schema "O01_231_GLO_DEF.xsd" can require that "Segment_231.xsd" be imported, along with "Fields_ 231.xsd" and "Tables_231.xsd." A business rule schema can additionally comprise a list of segments and/or groups that are associated with a specific trigger event. A single VAX can then be generated that comprises both the business rules and the metadata schemas, such that each VAX is associated with a particular message type.

According to an aspect of the invention, the schema generator 104 can analyze both a translation specification and a transformation specification for a message and can convert the message simultaneously into a plurality of messages suitable for delivery to different destination applications. This aspect facilitates generation of VAXs in an extensible manner that allows versioning information to be stored, which is desirable when integrating different business applications that use variants of the same schema. Thus, multiple versions of a single segment can be stored such that a first application can utilize a first version and a second application can utilize a second version, etc. Changes made to a particular segment, field, component, sub-component, etc., can be immediately reflected in all schemas that consume the particular segment, field, component, sub-component, etc. Additionally, during message translation, messages can undergo a comprehensive validation process that can detect errors therein. Errors can be corrected using data manipulation technology, such as an XML document/form editor and the like. For instance, different versions of forms can be generated for each schema by the schema generator 104.

Figure 2:
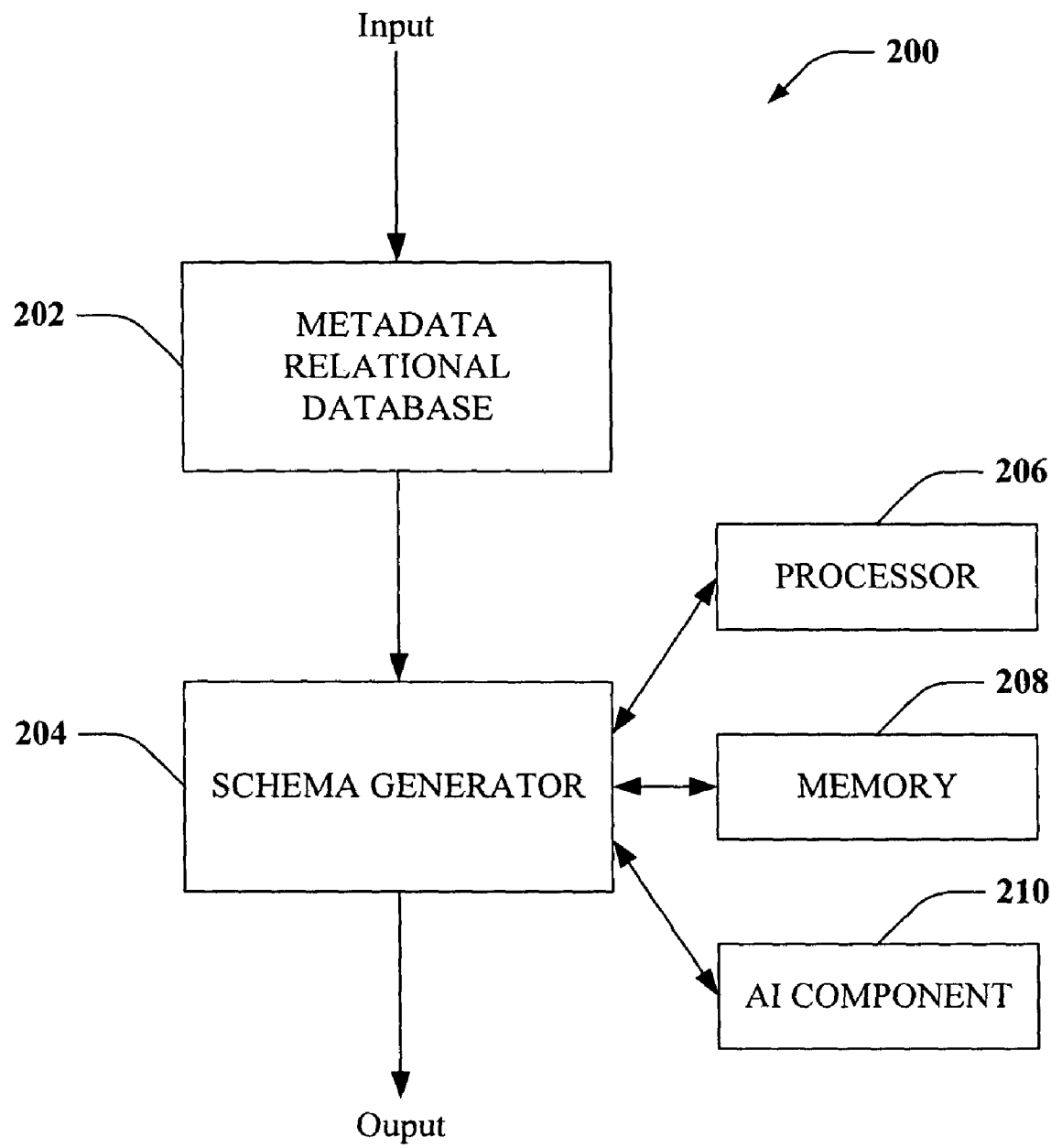
FIG. 2 illustrates a system 200 that facilitates VAX generation in accordance with an aspect of the subject invention.

Referring now to FIG. 2, there is illustrated a system 200 that facilitates VAX generation in accordance with an aspect of the subject invention. The system 200 comprises a metadata relational database 202 and a schema generator 204 as discussed with regard to FIG. 1. The metadata relational database 202 can receive and store information such as a native XSD, delimited flat-file, etc. The schema generator 204 can parse segments of the native XSD in order to generate a VAX that represents information from the native XSD as well as information related to validation logic and/or business rules employed to destination-specific versions of the XSD message. Such VAXs can be associated with trigger events (e.g., included in the business rules, annotations, etc.) that dictate when a particular version of a message is to be transmitted to its target destination. Additionally, VAXs can be associated with sub-library schemas that comprise information related to encoding rules for the XML message.

The schema generator 204 can be further operatively coupled to a processor 206 that analyzes data received and/or generated by the schema generator 204, and a memory 208 that stores information associated with system operations. It is to be appreciated that the processor 206 can be a processor dedicated to analyzing information received by the schema generator 204, a processor that controls one or more components of the system 200, and/or a processor that both analyzes information received by the schema generator 204 and controls one or more components of the system 200.

The memory 208 can additionally store protocols associated with generating VAXs from data stored in the relational database 202, such that the system 200 can employ stored protocols and/or algorithms to parse flat file XSD segments, to group segments contained in the flat-file XSD when generating VAXs, to permit changes to field, component, and/or subcomponent values in the VAXs, and the like. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 208 of the present systems and methods is intended to comprise, without being limited to, these and any other suitable types of memory.

The schema generator 204 is further operatively coupled to an artificial intelligence (AI) component 210 that can make inferences regarding operation of the system 200. For example, the AI component 210 can infer a proper parsing algorithm to be employed when grouping XSD segments to generate a VAX. Additionally and/or alternatively, the AI component 210 can be employed to determine an appropriate grouping methodology (e.g., sequence, choice, . . . ) to utilize when grouping segments, groups of segments, and the like. The preceding examples are illustrative in nature, and are not intended to limit the scope of the manner in which the AI component 210 makes inferences or the number of inferences that can be made by the AI component 210.

Figure 3:
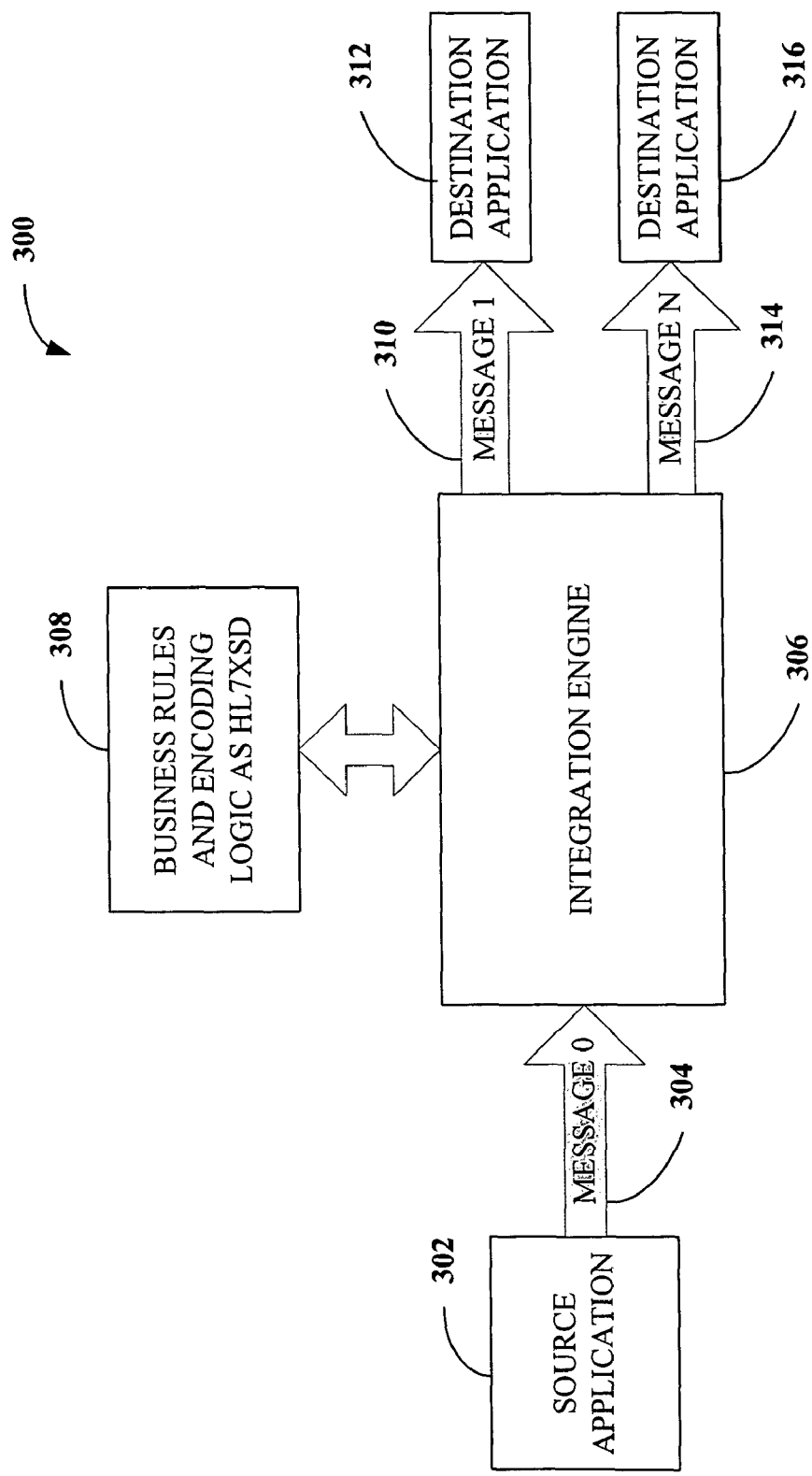
FIG. 3 is an illustration of a system 300 for generating VAX schema in accordance with an aspect of the subject invention.

FIG. 3 is an illustration of a system 300 for generating VAX schema in accordance with an aspect of the subject invention. The system 300 comprises a source application 302 that transmits a message 304 to an integration engine 306, which can be similar to and/or comprise the schema generator described with regard to FIGS. 1 and 2. The message 304 can be formatted, for instance, as a flat-file native XSD and can contain data related to a particular patient in a health care environment. An HL7XSD (e.g., a VAX) 308 comprising business rules and/or encoding logic germane to the particular health care environment in which the system 300 is employed can be utilized by the integration engine 306 to reformat and validate data in the message 304 in order to generate one or more output messages 310 and 314. The reformatted messages 310 and 314 can then be transmitted to respective destinations 312 and 316. For instance, the source application 302 can be associated with an admissions unit at a health care facility. Upon entry of patient identification information, insurance information, symptom information, etc., a flat-file message 304 comprising such information can be transmitted to the integration engine 306. The integration engine can parse the message 304 and regroup information therein into a VAX format.

For example, a VAX-formatted message 310 can be generated and transmitted to a history application 312, which can generate an acknowledgement and/or update any and all historical data related to the admitted patient. Additionally and/or alternatively, a message 314 can be formatted and transmitted to a financial transaction application 316, wherein patient insurance information, payment method information, balance information, and the like can be stored, updated, etc. For instance, a financial transaction application might typically consume fifty types of messages. Modifying a locally identified value fifty times can be tedious and detrimental to system function. However, by modifying the value globally (e.g., in the schema), the system 300 can streamline message transmission and processing efficiency. Other application destinations to which messages can be transmitted from the integration engine can include without being limited to, for example, a triage application where priority information can be stored and/or updated, a laboratory application where information related to lab workups can be received and/or prepared, and the like.

Figure 4:
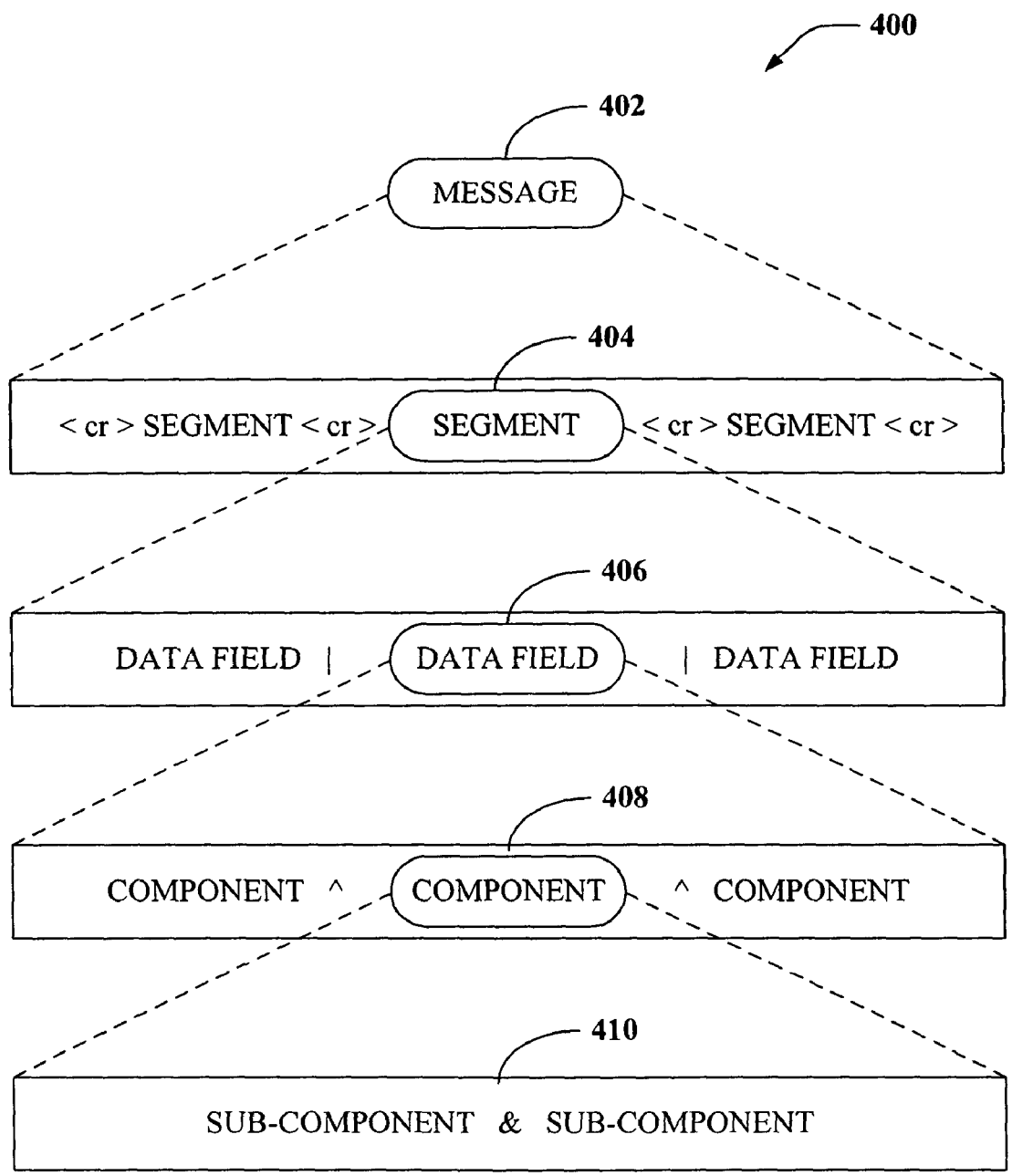
FIG. 4 illustrates a data structure 400 for a VAX that can be generated from a native XSD, in accordance with an aspect of the subject invention.

FIG. 4 illustrates a data structure 400 for a VAX that can be generated from delimited flat-file data, in accordance with an aspect of the subject invention. A message 402 can be reorganized to comprise one or more segments 404. Each segment 404 can comprise one or more fields 406, which can be delimited by the "|" symbol. Fields can comprise complex data types, simple data types, or a combination thereof. Additionally, fields can be optional. For example, a field's existence can be pendant from the existence of another field, a trigger event, etc. To further this example, a field for the name of a referring doctor is optional until an actual referral is entered and triggers the field's existence.

Each field 406 can further comprise one or more components 408, which can also comprise simple data types, complex data types, or both. It will be noted that components 408 are delimited by the "^" symbol. Components 408 can still further comprise one or more subcomponents 410, which can be delimited by the "&" symbol. Subcomponents 410 typically comprise simple data types. Additionally, fields, components, and the like can be associated with one or more enumeration tables that can define constant values that can be imported and/or selected (e.g., Mr., Mrs., Ms., Dr., . . . ). In this manner, message content information can be organized to facilitate generation of a VAX, as illustrated with regard to FIGS. 5-8.

Encoding rules used to encode the VAX can comprise, for example, limitations on the number of segments in a group, fields in a segment, components in a field, sub-components in a component, etc. For instance, a segment related to insurance information can be limited to 3 fields, such as "primary insurance," "secondary insurance," and "supplemental insurance." According to another example, a data field such as an "emergency contact" in a PID segment can be limited to 4 components, such as "last name," first name," "title," and "10-digit phone number." According to yet another example, business rules can be defined such that they are subject to change at a specific time. For instance, a first business rule can be tagged as being valid up to a certain date, such as December 31 of a given year, and a second business rule can be tagged as being valid after December 31 of that year, such that at 12:00 a.m. on January 1, the second business rule will be employed to the exclusion of the first. According to this example, the temporal point of 12:00 a.m. January 1 can be a trigger event.

Figure 5:
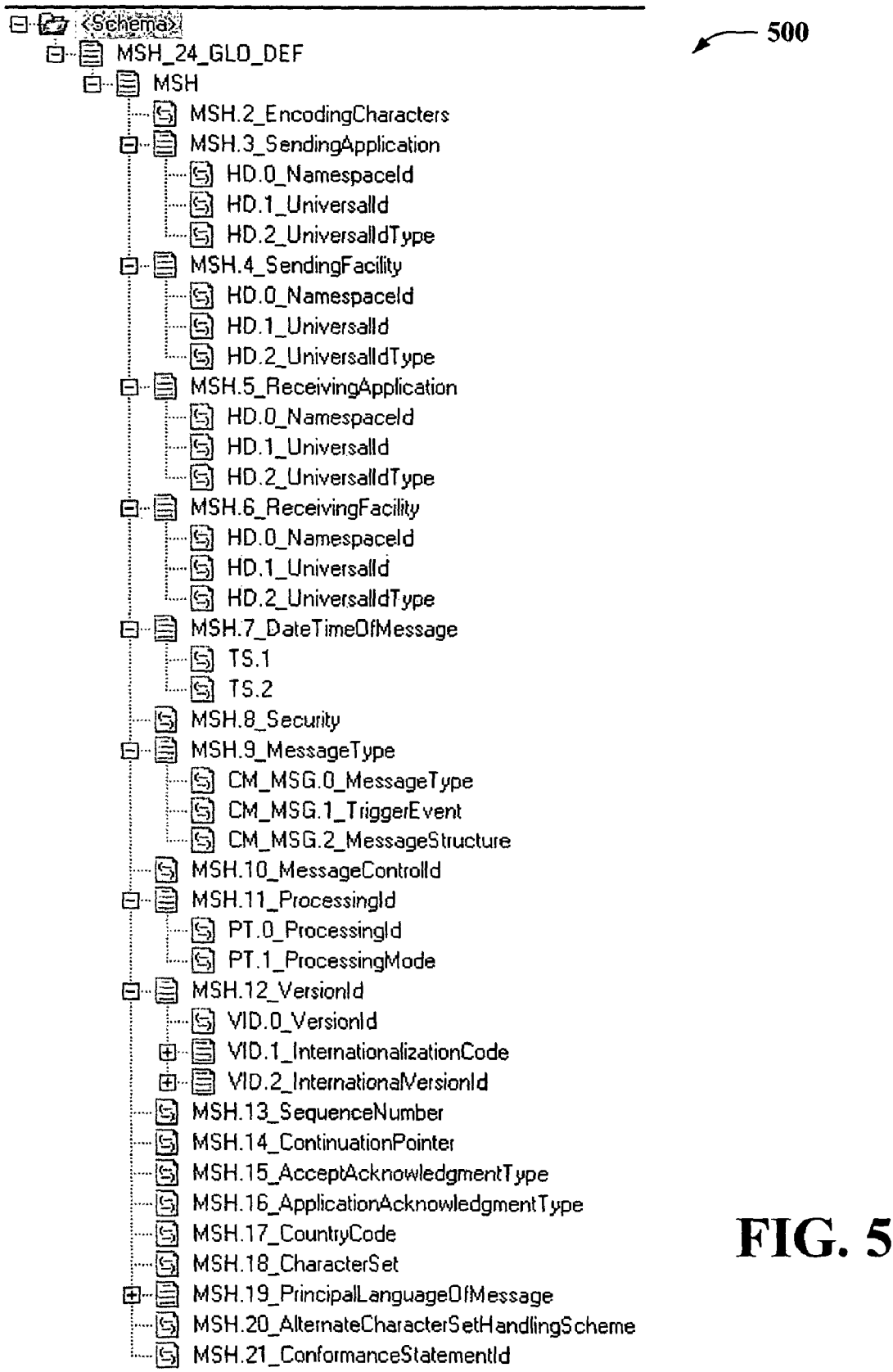
FIG. 5 illustrates VAX 500 that represents header segments in accordance with an aspect of the subject invention.

FIG. 5 illustrates VAX 500 that represents header segments in accordance with an aspect of the subject invention. The VAX is illustrated in a tree-view format that has expandable nodes arranged in a hierarchical manner. A primary branch of the VAX tree is labeled "MSH_24_GLO_DEF," indicating that header nodes pending from that branch are globally defined, such that annotations and/or changes made thereto can be provided to change segment, field, component subcomponent, etc., at a single location and messages generated thereafter can comprise such updated information and/or schemas. For example, a first node within the global definition branch labeled "MSH" and comprises a plurality of other message header nodes MSH.2-MSH.21. Each of the message header nodes respectively comprises one or more header definitions (e.g., HD.0_NamespaceId, . . . ).

Figure 6:
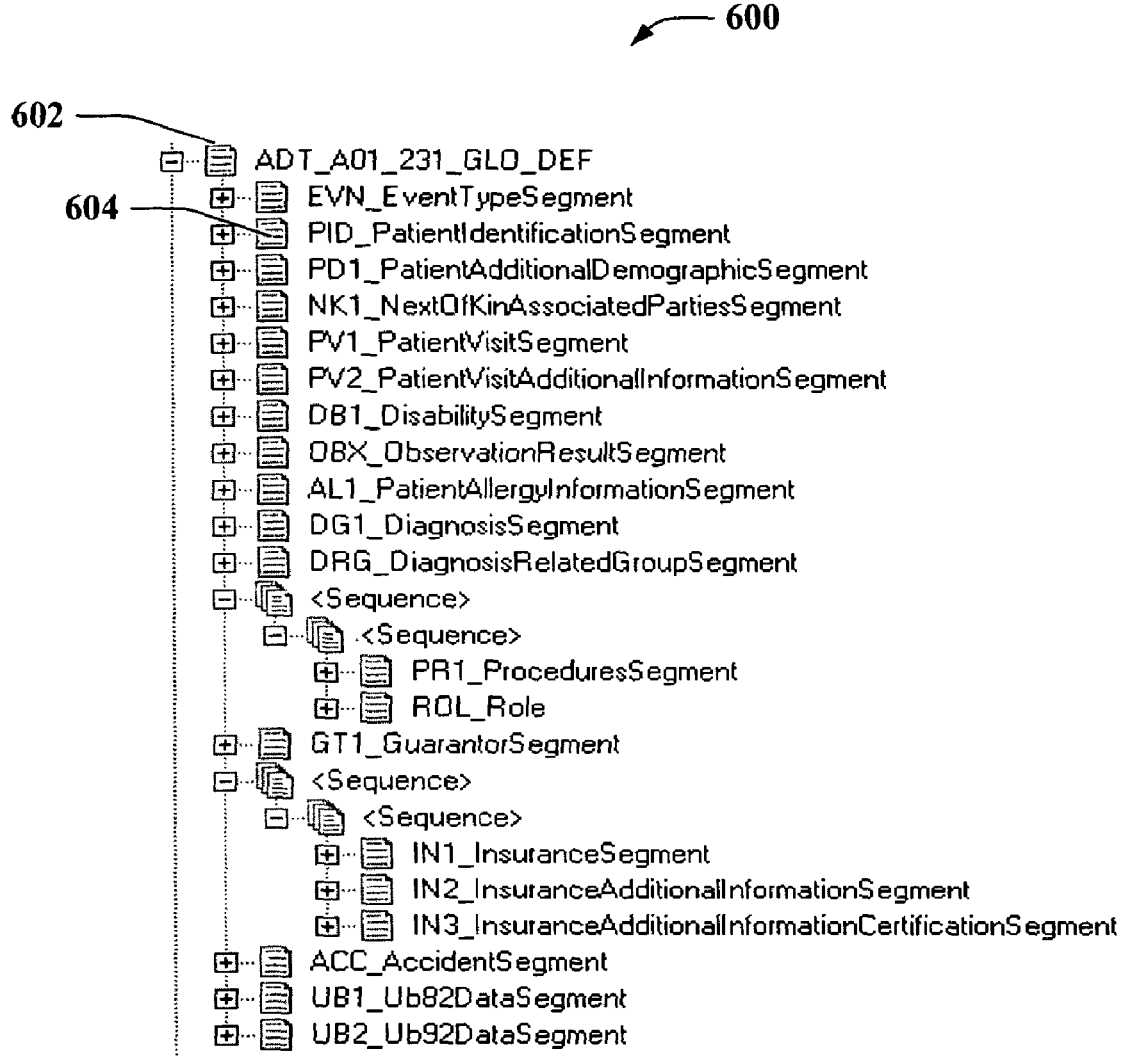
FIG. 6 is an illustration of a tree-view of a VAX 600 representing a body segment of HL7 messages in accordance with an aspect of the subject invention.

FIG. 6 is an illustration of a tree-view of a VAX 600 representing a body segment of HL7 messages in accordance with an aspect of the subject invention. The initial header 602 is labeled "ADT_A01__231_GLO_DEF" and indicates that the message is related to admissions information and provides a global definition for such information. A header for a patient information segment 604 is illustrated as the second primary branch on the VAX tree. Data values changed in the VAX can be globally updated.

Figure 7:
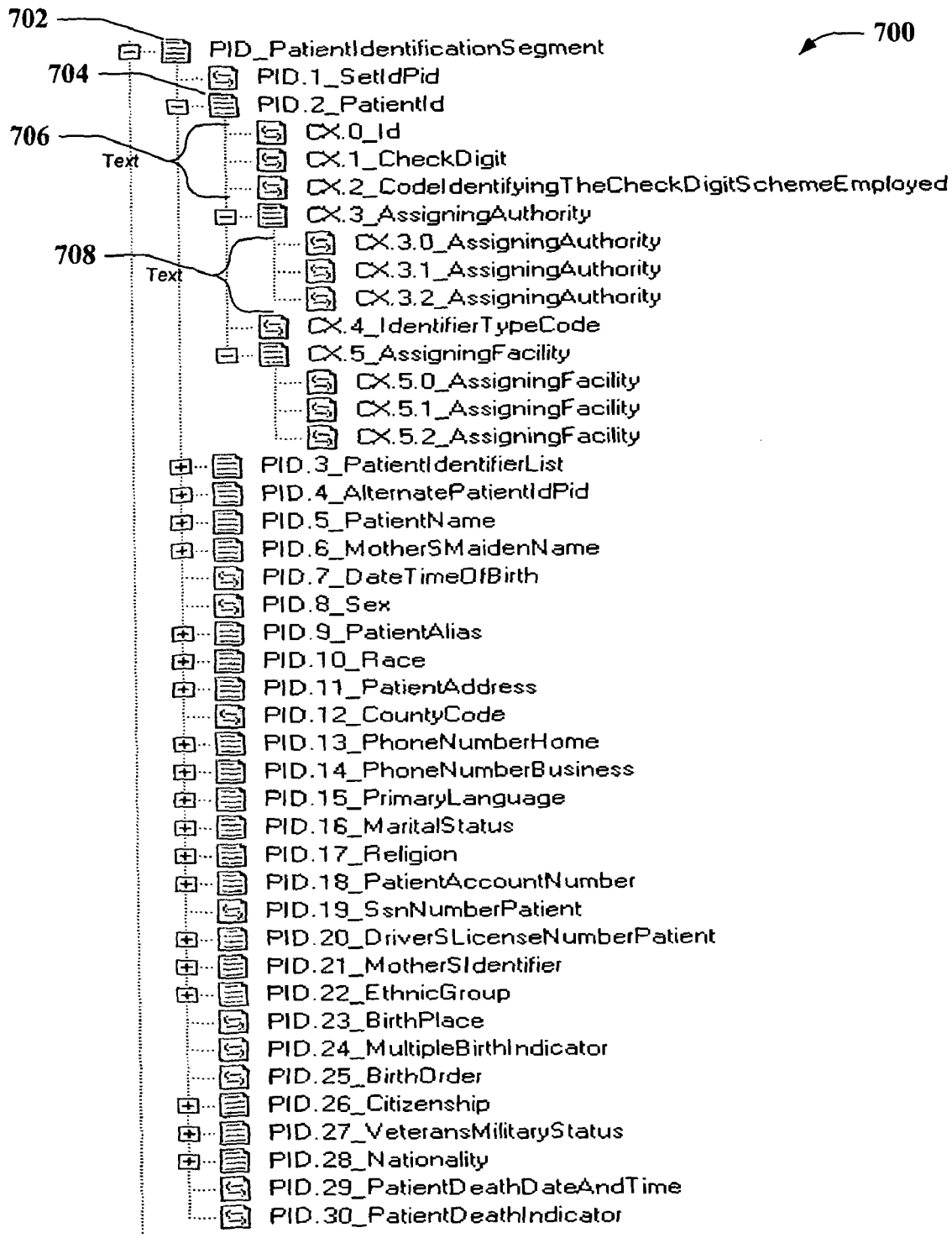
FIG. 7 illustrates a tree-view of a PID segment in a VAX 700 in accordance with an aspect of the subject invention.

FIG. 7 illustrates a tree-view of a PID segment in a VAX 700 in accordance with an aspect of the subject invention. The VAX 700 comprises a hierarchical structure with a PID segment 702 that comprises a plurality of data fields 704 (e.g., PID.1_SetIdPid, PID.2_PatientID, . . . ). The PID.2_PatientId field 704 is expanded to illustrate components 706 thereof (e.g., CX.0_Id, CX.3_AssigningAuthority, . . . ). A component 706 is further expanded to illustrate subcomponents 708 thereof (e.g., CX.3.1_AssigningAuthority, . . . ). Children of respective parent nodes can be arranged according to one or both of sequence and choice ordering schemes. Such ordering schemes can be defined by encoding rules associated with a particular application with which the subject invention is employed, and annotations regarding such encoding rules can be added when generating a VAX.

Figure 8:
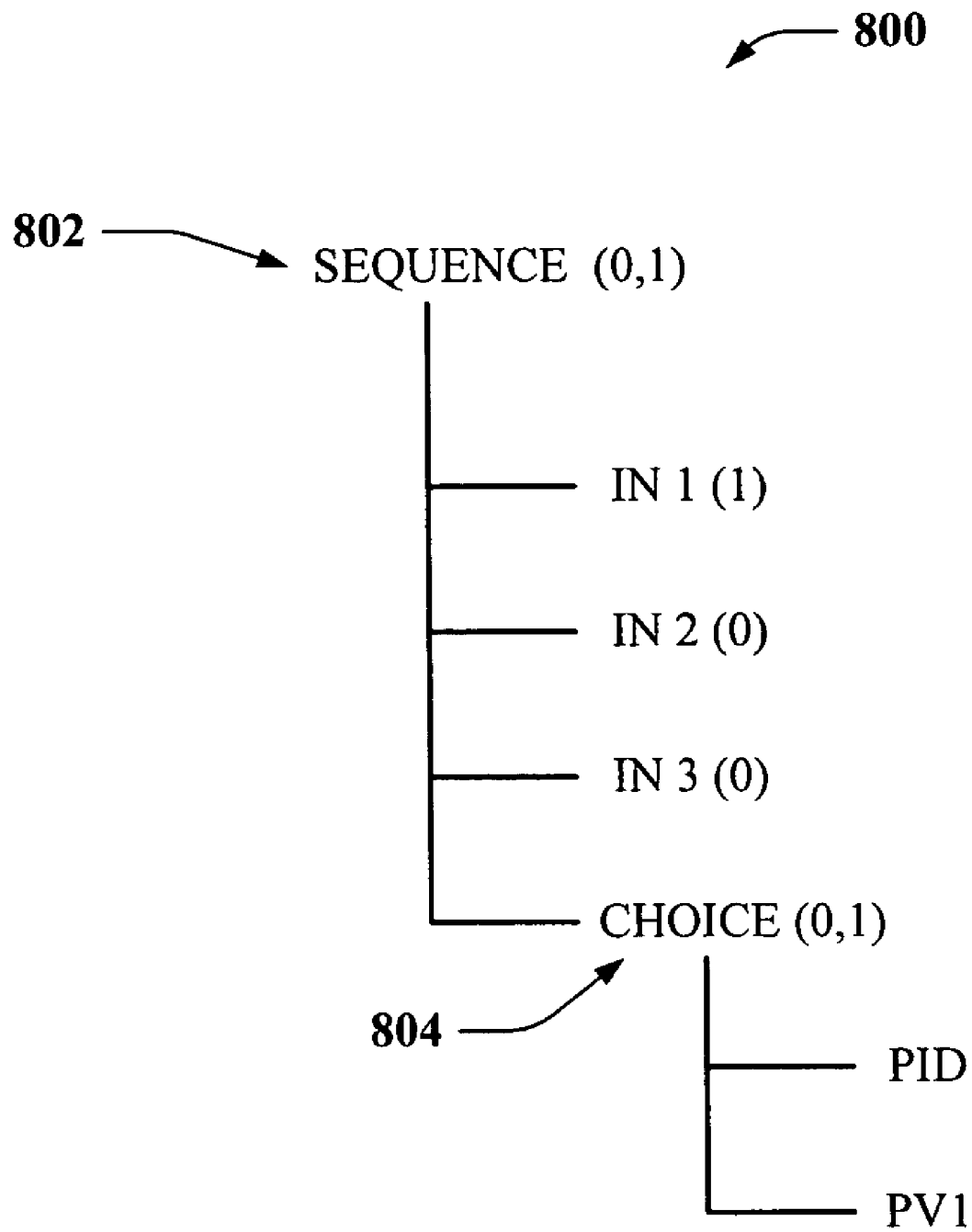
FIG. 8 is an illustration of a simple ordering structure 800 that depicts both choice and sequence ordering arrangements, in accordance with an aspect of the subject invention.

FIG. 8 is an illustration of a simple ordering structure 800 that depicts both choice and sequence ordering arrangements, in accordance with an aspect of the subject invention. Headers, nodes associated therewith, and the like can be ordered using either "choice" or "sequence" grouping strategies, or a combination thereof. For example, information and/or nodes ordered in sequence are defined such that child elements appear sequentially, and each child element can appear between 0 and n times, where n is an integer. Nodes grouped according to a choice ordering can be specified such that one of a plurality of child elements can occur to the exclusion of other child elements of the same parent. Choice and sequence ordering schemes and/or requirements can be integrated into a VAX as annotations thereto.

According to the figure, a patient's insurance data is shown as having three segments (e.g., IN1, IN2, and IN3). The VAX structure comprises a sequence ordering 802 that has occurrence indicators of (0,1), indicating that each of the "insurance" child segments IN1, IN2, and IN3 can occur 0 or 1 times. Because IN1 is present as illustrated by the (1), IN2 and IN3 are optional as indicated by the (0). The sequence 802 further comprises a choice ordering 804, in which either a patient identification segment (PID) or a first patient visit segment (PV1) can exist. In this manner, three different payment methods can be grouped with either a patient's identity or with a particular patient visit. It is to be appreciated that the foregoing example is presented for illustrative purposes and is not intended to limit the number of segments or identities thereof that can be grouped and/or ordered by the subject invention.

Figure 9:
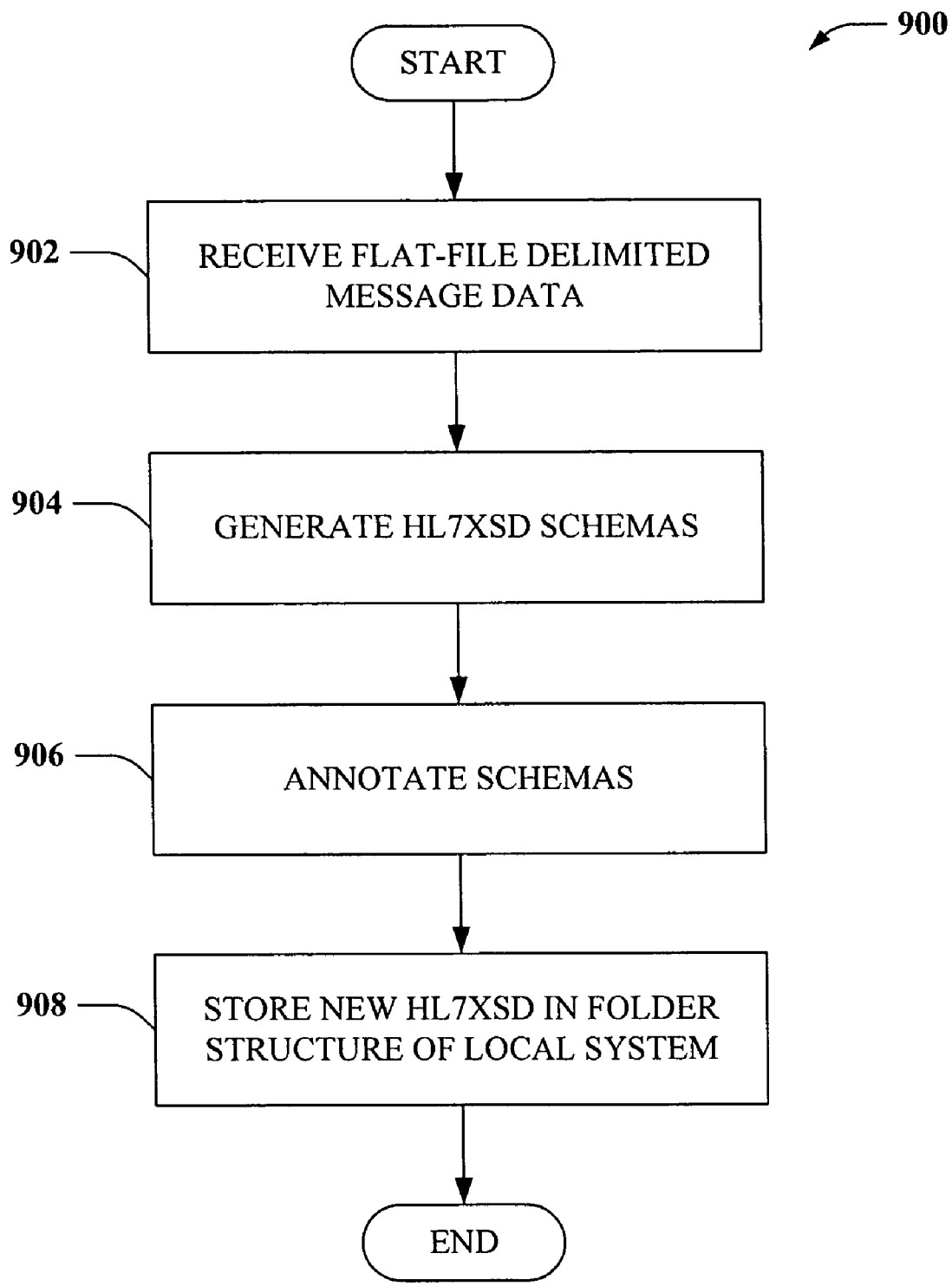
FIG. 9 is an illustration of a methodology 900 for generating value-added XSDs in accordance with the subject invention.
Figure 10:
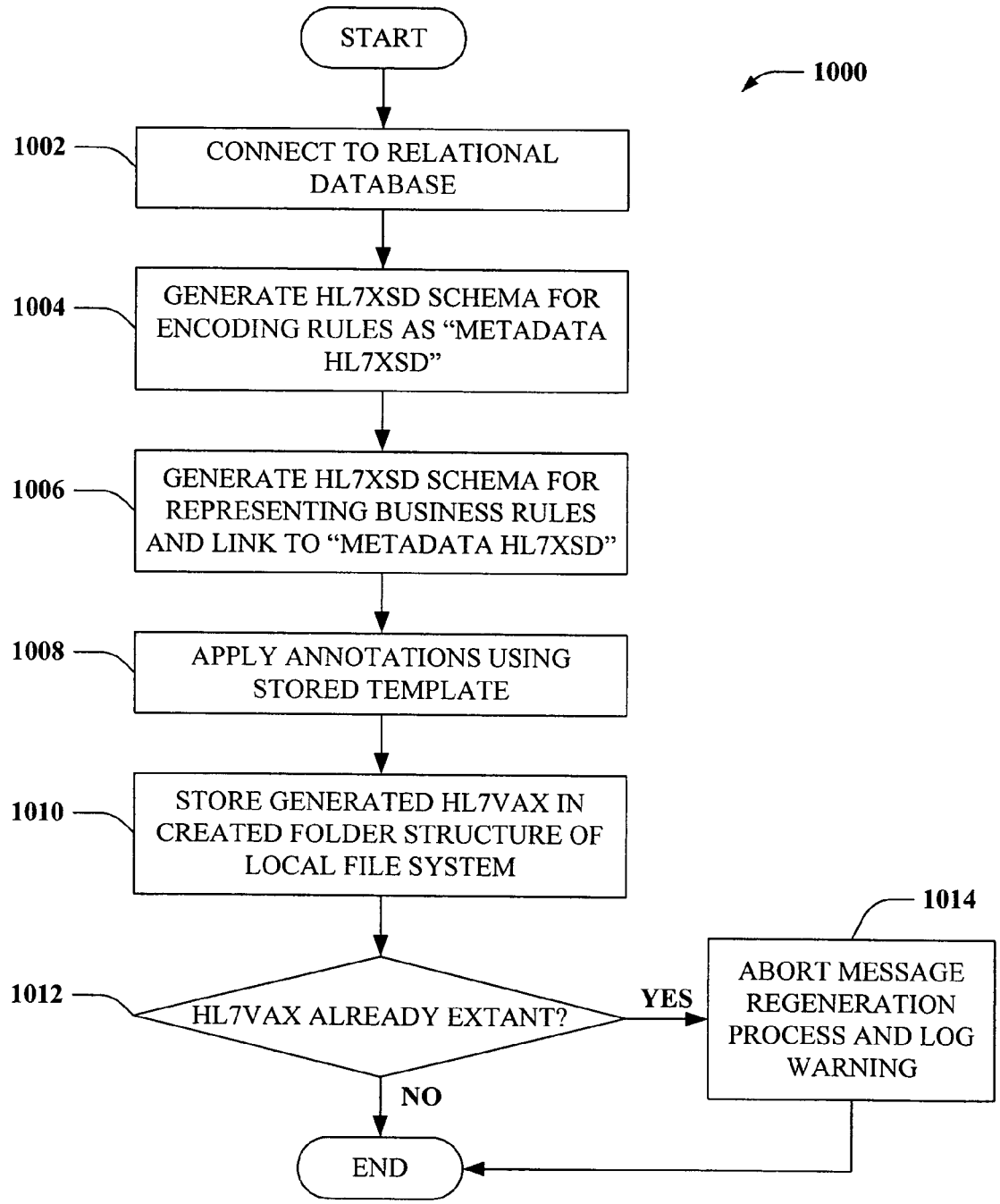
FIG. 10 illustrates a methodology 1000 for generating VAXs from flat-file delimited data in accordance with an aspect of the subject invention.

With reference to FIGS. 9 and 10, there are illustrated flowcharts in accordance with various aspects of the subject invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts can, in accordance with the subject invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Referring now to FIG. 9, there is illustrated a methodology 900 for generating value-added XSDs in accordance with the subject invention. At 902, flat-file delimited data, such as an HL7 document, can be received. Information contained in the flat-file message can be parsed according to delimiters defined in the message header and employed in the message body to separate message portions. Based on such delimiter information, at 904, HL7XSD schemas can be generated, which can comprise a metadata schema that has information related to representations of segments, fields, components, and sub-components, as well as a business rule schema that comprises information related to predefined formatting rules for a specific business environment, such as a hospital. At 906 the HL7XSD can be annotated using a stored template to generate a VAX. Annotations can provide information related to reorganization of delimited flat-file segments, fields, etc., groupings thereof (e.g., choice, sequence, . . . ), and the like. Once annotated, the HL7VAX can be stored in a created folder structure in a local file system at 908. Fore example, the folder structures of FIGS. 5-7 can be representative of folder structure generated to store one or more VAXs.

Referring now to FIG. 10, there is illustrated a methodology 1000 for generating VAXs from flat-file delimited data in accordance with an aspect of the subject invention. According to the methodology 1000, at 1002, a connection can be established with a relational database in which flat-file data and/or messages related thereto are stored. At 1004, a metadata XSD can be generated. The metadata XSD can comprise, for example, information related to segments and/or groups thereof in the flat-file message, data fields within segments, components within fields, sub-components of components, etc. At 1006, a business rule XSD can be generated and linked to the metadata XSD for the particular message and/or message type. Business rule information can comprise, for example, information that triggers events based on the message. For instance, a business rule can require an acknowledgement to be sent from an application that has received a message to an application that transmitted the message. At 1008, the combined business-rule-and-metadata XSD can be annotated using a stored template to created a value-added XSD. Annotations can include, for example, information related to VAX structure, business rules, groupings of segments, fields, etc., or any other suitable information that facilitates converting a message simultaneously into a plurality of messages suitable for delivery to a plurality of destinations. The VAX can then be stored in folder structure generated in a local file system at 1010. For example, a the tree-formatted folder structures of FIGS. 5-7 represent VAX storage structures that can be utilized to store the VAX generated at 1002-1010.

At 1012, a determination can be made regarding whether a VAX for the particular message and/or flat file data undergoing translation and transformation already exists. If it is determined that no such VAX already exists, the methodology can terminate. If it is determined that a VAX for the particular message type has already been created, then at 1014, message regeneration can be aborted and a warning can be logged. It is to be appreciated that checking for an extant VAX as described with regard to 1012 and 1014 can occur earlier in the methodology 1000 if desired, in order to mitigate unnecessary system resource consumption by generating a duplicate VAX.

The subject invention (e.g., in connection with generating VAXs) can employ various artificial intelligence based schemes for carrying out various aspects thereof. For example, a process for determining when a message requires a VAX can be facilitated via an automatic classifier system and process. Moreover, where the message is of a type that is likely to be transmitted frequently and to multiple destination applications and/or is likely to be updated or modified often, the classifier can be employed to determine which internal portions of the VAX related thereto require modification, etc.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of relational databases and schema generation, for example, attributes can be data entries or other data-specific attributes derived from the data entries (e.g., database tables, the presence/identity of delimiters), and the classes are categories or areas of interest (e.g., segments, fields, components, sub-components, business rules, . . . ).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to, training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically perform a number of functions, including but not limited to determining according to a predetermined criteria when a VAX is generated, when it is regenerated (i.e., updated), which portions of the VAX are to be regenerated, etc. The criteria can include, but is not limited to, business rules associated with a particular environment and/or application in which the subject invention is employed, a frequency with which messages require modification, etc.

Figure 11:
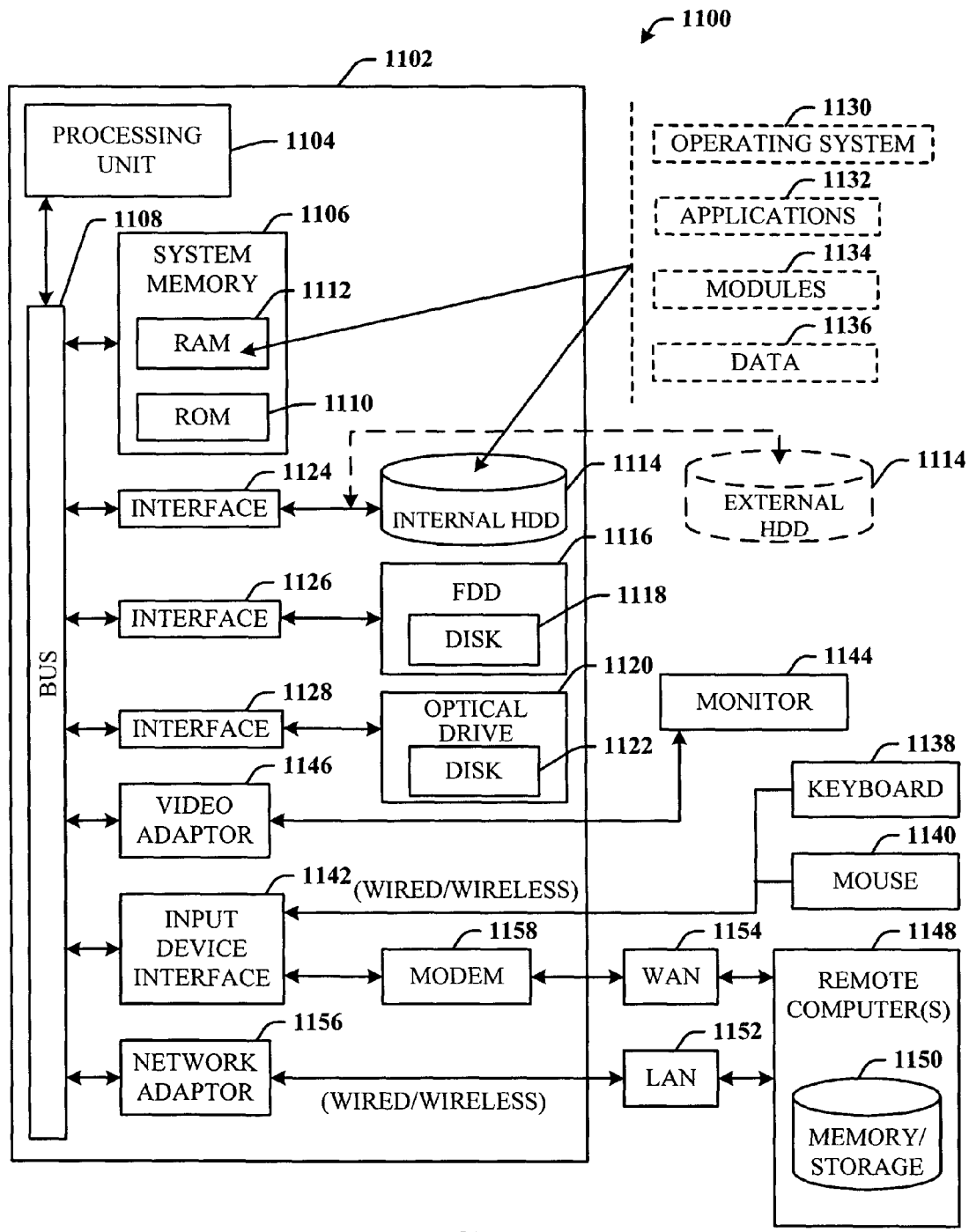
FIG. 11 illustrates a block diagram of a computer operable to execute the disclosed architecture.

Referring now to FIG. 11, there is illustrated a block diagram of a computer operable to execute the disclosed architecture. In order to provide additional context for various aspects of the subject invention, FIG. 11 and the following discussion are intended to provide a brief, general description of a suitable computing environment 1100 in which the various aspects of the subject invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, there is illustrated an exemplary environment 1100 for implementing various aspects of the invention that includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the subject invention.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the subject invention can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156. When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
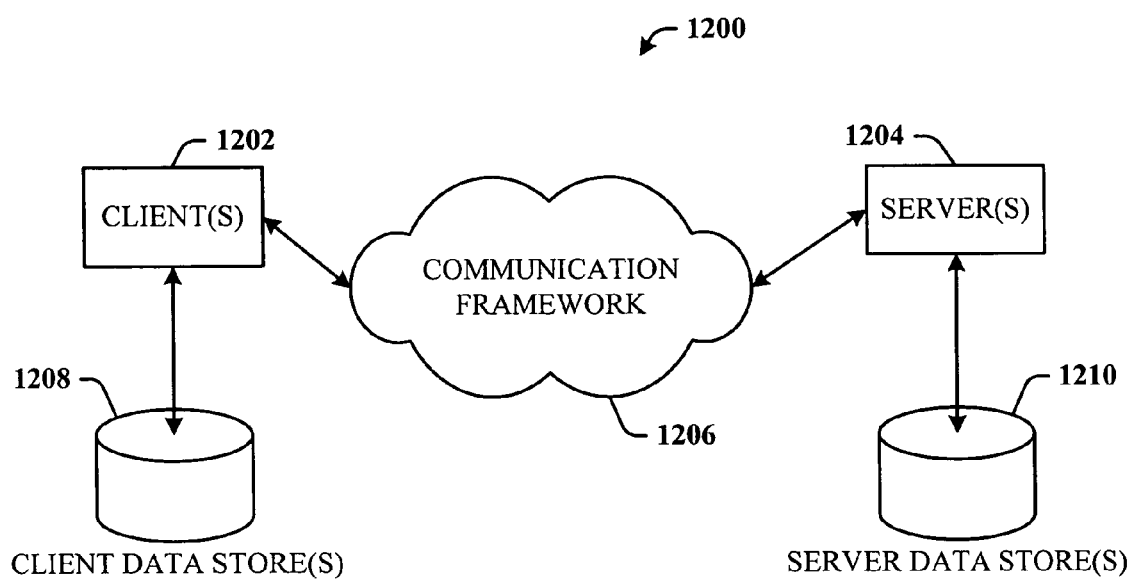
FIG. 12 illustrates a schematic block diagram of an exemplary computing environment in accordance with the subject invention.

Referring now to FIG. 12, there is illustrated a schematic block diagram of an exemplary computing environment 1200 in accordance with the subject invention. The system 1200 includes one or more client(s) 1202. The client(s) 1202 can be hardware and/or software (e.g., threads, processes, computing devices). The client(s) 1202 can house cookie(s) and/or associated contextual information by employing the subject invention, for example. The system 1200 also includes one or more server(s) 1204. The server(s) 1204 can also be hardware and/or software (e.g., threads, processes, computing devices). The servers 1204 can house threads to perform transformations by employing the subject invention, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system that facilitates generating value-added extensible markup language schema definitions (VAXs) from flat-file data in a relational database, comprising:
    a relational database that stores structural data that is formatted according to Health Level 7 standards in a plurality of data tables in a computer memory;
    a schema generator that receives the structural data from the relational database and generates a VAX from the structural data, the VAX comprising a metadata extensible markup language schema that describes the structural data and a business rule extensible markup language schema that describes trigger events related to the structural data, wherein the schema generator generates the VAX by parsing the structural data according to delimiters defined in the structural data and regrouping the data into a hierarchical structure that is included in the VAX, the hierarchical structure comprising segments, fields, components, and sub-components, respectively, the schema generator further receiving a message that is formatted according to the Health Level 7 standards, wherein the schema generator uses the VAX to transform the message into a plurality of different output messages such that each output message is customized using business rules from the business rule extensible markup language schema, the business rules defining a trigger event based on the contents of the received message and a list of segments that are to be included within the output message based on the trigger event, the segments being defined in the metadata extensible markup language schema; and
    a processor that executes the schema generator.

2. The system of claim 1, wherein the data in the hierarchical structure is grouped according to at least one of a sequence ordering and a choice ordering.

3. A method of transforming business rules and encoding rules defined in a persistent and relational format into extensible markup language (XML) schema compatible with Health Level 7 standards, comprising:
    receiving data items that are formatted in flat-file delimited format according to Health Level 7 standards;
    regrouping the delimited data items by parsing the data items according to the delimiters and regrouping the parsed data items hierarchically by arranging the data items into one or more groups of segments, wherein segments optionally comprise one or more fields, which comprise one or more components;
    generating a metadata XML schema that describes the reorganized data items, the metadata XML schema having a hierarchical structure of segments or groups thereof, wherein segments comprise zero or more fields, fields comprise zero or more components, and components comprise zero or more sub-components;
    generating a business rule XML schema that defines at least one trigger event based on contents of received messages;
    linking the business rule XML schema to the metadata XML schema to create a value-added XML schema (VAX) that describes how to process messages that are received that conform to the flat-file delimited format;
    receiving a message that conforms to the flat-file delimited format; and
    transforming the message into a plurality of different output messages such that each output message is customized using business rules from the business rule XML schema, wherein the at least one trigger event is used to determine a list of segments to include in each of the output messages, the segments being defined in the metadata XML schema of the VAX.

4. The method of claim 3, further comprising employing a stored template to annotate the VAX.

5. The method of claim 4, annotations comprise information related to grouping data items according to at least one of a choice grouping scheme and a sequence grouping scheme.

6. The method of claim 3, trigger events comprise information related to actions associated with a patient in a health care environment.

7. The method of claim 3, further comprising validating data during schema generation to detect errors.

8. The method of claim 3, wherein the flat-file delimited format is a "pipe-and-hat" delimited format.

9. The method of claim 3, components comprise one or more subcomponents which are of a simple data type.

10. One or more computer storage media storing computer executable instructions which when executed by a processor perform the method of claim 3.

11. One or more computer storage media storing computer executable instructions which when executed by a processor perform a method of generating value-added extensible markup language schema definitions (VAXs) from flat-file data in a relational database, comprising:

receiving structural data from a relational database, the structural data conforming to the Health Level 7 standards;

parsing the structural data according to delimiters defined in the structural data;

generating a VAX from the structural data, the VAX comprising a metadata extensible markup language schema that describes the structural data and a business rule extensible markup language schema that describes trigger events related to the structural data, wherein generating the VAX comprises regrouping the data into a hierarchical structure that is included in the metadata extensible markup language schema, the hierarchical structure comprising segments, fields, components, and sub-components, respectively;

receiving a message that is formatted according to the Health Level 7 standards;

applying the VAX to the message to transform the message into a plurality of different output messages such that each output message is customized using business rules from the business rule extensible markup language schema, the business rules defining a trigger event based on the contents of the received message and a list of segments that are to be included within the output message based on the trigger event, the segments being defined in the metadata extensible markup language schema.

12. The computer storage media of claim 11 wherein the data in the hierarchical structure is grouped according to at least one of a sequence ordering and a choice ordering.

13. The computer storage media of claim 11 further comprising:

employing a stored template to annotate the VAX.

14. The computer storage media of claim 13 wherein the annotations comprise information related to grouping data items according to at least one of a choice grouping scheme and a sequence grouping scheme.

15. The computer storage media of claim 11 wherein the trigger events comprise information related to actions associated with a patient in a health care environment.

* * * * *